INVENTOR.
ERNEST H. GATZERT
BY Francis E Blake
ATTORNEY

INVENTOR.
ERNEST H. GATZERT
BY Francis E Blake
ATTORNEY

INVENTOR.
ERNEST H. GATZERT
BY *Francis E Blake*
ATTORNEY

INVENTOR.
ERNEST H. GATZERT
BY
Francis E. Blake
ATTORNEY

INVENTOR.
ERNEST H. GATZERT
BY
Francis E. Blake
ATTORNEY

INVENTOR.
ERNEST H. GATZERT
BY
Francis E Blake
ATTORNEY

INVENTOR.
ERNEST H. GATZERT
BY
Francis E. Blake
ATTORNEY

INVENTOR.
ERNEST H. GATZERT
BY Francis E. Blake
ATTORNEY

Dec. 9, 1958 E. H. GATZERT 2,863,944

TELEPHONE SYSTEM

Filed Nov. 16, 1954 11 Sheets-Sheet 9

INVENTOR.
ERNEST H. GATZERT

BY Francis E. Blake

ATTORNEY

Dec. 9, 1958

E. H. GATZERT 2,863,944

TELEPHONE SYSTEM

Filed Nov. 16, 1954

11 Sheets-Sheet 10

INVENTOR.
ERNEST H. GATZERT
BY Francis E. Blake
ATTORNEY

Dec. 9, 1958 E. H. GATZERT 2,863,944

TELEPHONE SYSTEM

Filed Nov. 16, 1954 11 Sheets-Sheet 11

*INVENTOR.*
ERNEST H. GATZERT

*BY*
Francis E. Blake
ATTORNEY

United States Patent Office
2,863,944
Patented Dec. 9, 1958

2,863,944

TELEPHONE SYSTEM

Ernest H. Gatzert, Rochester, N. Y., assignor, by mesne assignments, to General Dynamics Corporation, a corporation of Delaware Application November 16, 1954, Serial No. 469,133
12 Claims. (Cl. 179—7.1)

The present invention relates to telephone systems, and more particularly to trunking circuits embodying conversation timing arrangements.

It is well known to provide a two way trunk circuit at a local office to connect over a trunk line to a two way trunk circuit at a distant office. It has also been proposed that a conversation timing arrangement be provided in one of the trunk circuits to time out calls that are outgoing from the trunk circuit having the conversation timing circuits. It may also be desirable to provide that the conversation timing circuit be arranged to time out calls incoming to the trunk circuit as well as outgoing.

It is a principal object of the present invention to provide a telephone system having an improved arrangement of trunk circuits embodying conversation timing.

It is another object of the invention to provide a telephone system having a two way trunk circuit with an improved conversation timing arrangement that is effective to time out calls that are either outgoing or incoming to the trunk circuit.

When timing out a call by forcibly disconnecting the incoming switch or circuits associated with the incoming trunk circuit, there must be provisions to guard the trunk circuit having the conversation timing equipment against seizure by other associated local circuits for subsequent calls until after the trunk circuit at the distant office has been released from connection with its associated circuits.

Another object of the present invention is to provide a two way trunk circuit having a conversation timing arrangement that is operative for both incoming and outgoing calls, and providing a novel means effective with either incoming or outgoing calls to guard the trunk circuit having the conversation timing arrangement against seizure after timing out and until after the trunk circuit at the other end of the trunk line has been released from connection with its associated circuits.

A feature of the invention is the provision of a local two way trunk circuit having a conversation timing circuit that is effective to time out by forcibly disconnecting the incoming switch for either the local trunk circuit or the remote trunk circuit depending upon the direction of the call, and that is further effective to guard the local trunk circuit against seizure until the distant trunk circuit has been released on either incoming or outgoing calls that have been timed out.

Figure 11:
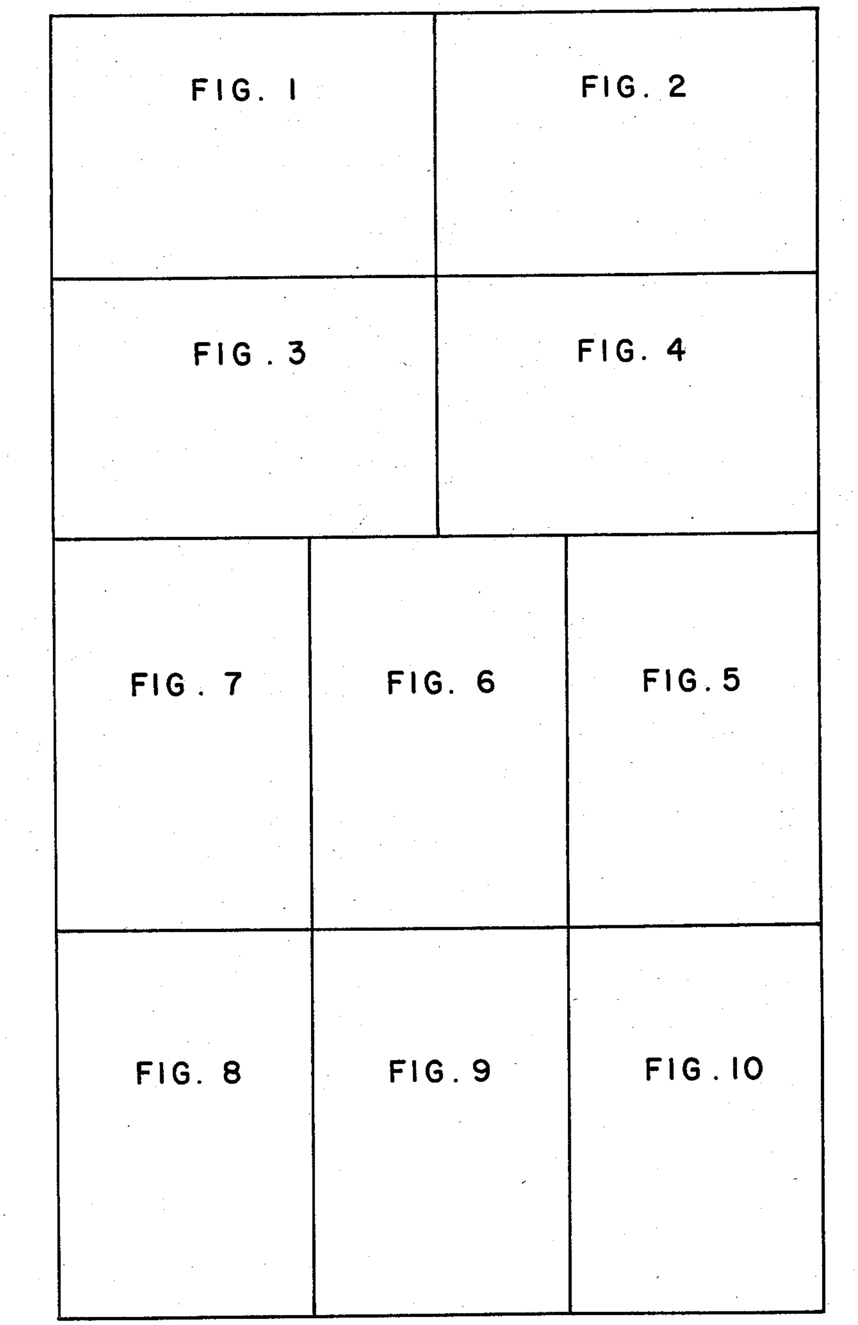

Further objects, features, and the attending advantages of the invention, will be apparent with reference to the following specification and drawings in which Figs. 1–4, inclusive, taken together and arranged in the order shown in Figure 11, comprise a remote two way trunk circuit;

Figs. 5–10, inclusive, taken together and arranged in the order shown in Fig. 11 of the drawings, comprise a two way local trunk circuit as provided with the conversation timing and disconnect testing features of the invention; and Fig. 11 is a block diagram to show the arrangement of Figs. 1–10 of the drawings in relation to each other for showing the telephone system of the invention including both local and remote two way trunk circuits connected together over a trunk line of the loop type.

In the drawings, the negative side of the exchange battery is indicated by the symbol (−), and the positive side of the battery, which is usually connected to ground, is indicated by the symbol (+).

Figure 6:
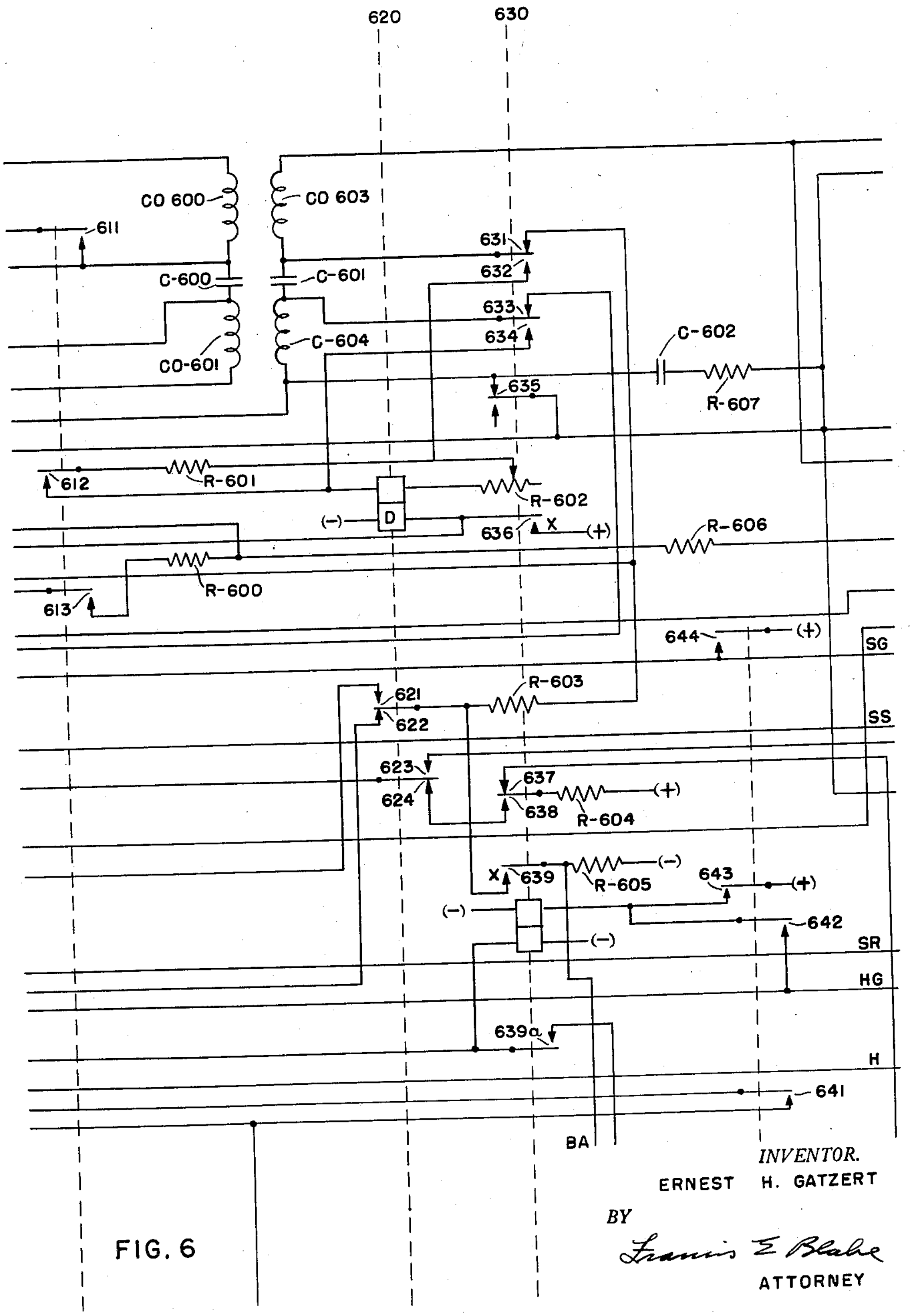

The system of the invention will be first described with reference to a call originating over the remote trunk circuit comprising Figs. 1–4 of the drawings, and incoming over the trunk line to the local trunk circuit comprising Figs. 5–10, inclusive, of the drawings. The remote outgoing circuit in the form of the preceding selector switch equipment S100 shown in Fig. 1 of the drawings, is operated to the selector switch contacts S101 by directive control when an outgoing call over the remote trunk circuits, shown in Figs. 1–4 of the drawings, is to be made. The contacts and bank wiring S101 terminate on the trunk equipment tip, ring, sleeve, and hunt sleeve conductors, T, R, S, and HS, respectively, and as the call is extended, the loop circuit across the conductors T and R operates relay 130 from ground through the upper winding of relay 130, normally closed contacts 141, repeating coil winding CO100, normally closed contacts 122, the loop circuit across conductors T and R, normally closed contacts 124, repeating coil winding CO101, normally closed contacts 143, and the lower winding of relay 130 to battery. Capacitors C100 and C101, together with capacitors C600 and C601, as shown in Fig. 6 of the drawings, will complete the transmission path between the calling and called parties in the well known manner.

The operation of relay 130 energizes relay 370 from ground through operated contacts 331 and the lower winding of relay 370 to battery. Operation of relay 130 also closes contacts 131 to close the loop circuit across the conductors T and R of the trunk line for subsequent holding and pulsing incoming to the trunk circuit equipment shown in Figs. 5–10, inclusive, of the drawings. The aforesaid operation of relay 370 also energizes relay 410 from ground through operated contacts 331 and 372 and winding of relay 410 to battery. Relay 410 remains operated during subsequent pulsing operations of relay 130 due to its slow release characteristics. The operation of relay 410 closes a holding circuit for relay 370 from ground through operated contacts 411 and the upper winding of relay 370 to battery. Operation of relay 410 also closes ground through contacts 211 to the incoming sleeve conductor S to thereby hold the preceding switch equipment S100.

Operation of relay 370 opens a multiple ground from the ATB meter through operated contacts 374 and normally closed contacts 345. When relays 410 and 370 restore at the completion of the call, the peg count meter is operated once from momentary ground through operated contacts 373, normally closed contacts 413, and operated contacts 351 of relay 350, which will be in the process of releasing at that time. Operation of relay 370 also lights lamp L300 from ground through normally closed contacts 365, operated contacts 376, normally closed contacts 347, and through lamp L300 to battery. Operation of relay 370 also closes ground through contacts 175 and the lower winding of the differentially wound supervisory relay 160 to battery. However, the supervisory relay 160 does not operate at this time.

Operation of relay 370 also closes a loop circuit across the outgoing trunk line conductors T and R from outgoing conductor T through normally closed contacts 221, repeating coil winding CO102, operated contacts 172, adjustable resistor R101, upper coil winding of relay 160, operated contacts 174, repeating coil winding CO103, operated contacts 131, normally closed contacts 223, and to outgoing conductor R. Capacitor C200 and resistor R200 are connected across the operating contacts 131 for contact protection purposes. The loop circuit across the outgoing conductors T and R, Fig. 2, extends over the trunk line to the trunk circuit of the local exchange shown in Figs. 5–10, inclusive, and energizes relay 710 from the incoming trunk line conductor T, normally closed contacts 512, repeating coil winding CO603, normally closed contacts 631 and 726, and upper winding of relay 710 to ground. The said loop circuit across the incoming conductors closes battery through the lower winding of relay 710, normally closed contacts 727 and 633, repeating coil winding CO604, normally closed contacts 635 and 514 to the trunk line conductor R. Operation of relay 710 energizes relay 750 from ground through operated contacts 811 and the lower winding of relay 750 to battery.

The operation of relay 750 closes a loop circuit to the associated local incoming circuit in the form of the selector switch shown in block outline at S800, through operated contacts 852, repeating coil winding CO600, operated contacts 752, resistor R606, upper winding of relay 510, operated contacts 754, repeating coil winding CO601, operated contacts 853 and 813 to the conductor R of the incoming selector switch S800. The aforesaid operation of relay 750 also connects ground through operated contacts 755 to the sleeve conductor S of the trunk circuit to thereby guard against outgoing calls from the associated local outgoing circuits in the form of the preceding selector switch equipment, such as shown in the block outline S700. Operation of relay 750 also connects battery through preliminary operated contacts 756 to the lower winding of the differential relay 510 and ground in a manner that relay 510 will not operate until the flow of current is reversed in its upper winding. The operation of relay 750 also connects the upper winding of relay 750 from battery through operated contacts 854 to the sleeve conductor S of the incoming switch equipment S800 so that the relay 750 will be held operated from ground from the incoming switch equipment in the well known manner. The operation of relay 750 also lights lamp L800 from battery through normally closed contacts 1012 and operated contacts 856 and lamp L800 to ground. Operation of relay 750 also connects ground through contacts 857 to the timing start lead of the common interrupter circuit (not shown).

The aforesaid calling party from the preceding equipment through the outgoing selector switch S100, may now proceed to continue pulsing to the succeeding equipment as connected through selector switch S800. Relay 130 will respond to the well known pulsing procedure of the calling party's dial by momentarily restoring relay 130 to open contacts 131 correspondingly. Momentary restoration of relay 130 also operates slow release relay 350 from ground through momentarily closed contacts 332, operated contacts 412, and winding of relay 350 in parallel with resistor R302 to battery. Relay 350 remains operated during pulsing due to its slow release characteristics. The operation of relay 350 shortcircuits the repeating coil winding CO101 by operated contacts 151 to thereby improve pulsing characteristics. The operation of relay 350 also connects resistor R100 by means of operated contacts 152 across the upper winding of relay 160 to improve pulsing characteristics. The momentary restoration of relay 710 of the local trunk circuit (Fig. 7) during pulsing, energizes slow release relay 910 from ground through momentarily closed contacts 812, operated contacts 851, and through winding of relay 910 in parallel with resistor R900 to battery. The operation of relay 910 shunts the repeating coil winding CO600 at operated contacts 611 and the upper winding of relay 510 and resistor R606 operated contacts 613 in series with resistor R600 to improve pulsing characteristics to the incoming switch equipment. The pulsing procedure continues in the well known manner until the required called line has been selected. Both relays 350 and 910 will restore at the completion of the transmission of dial pulses, as is well known.

Figure 1:
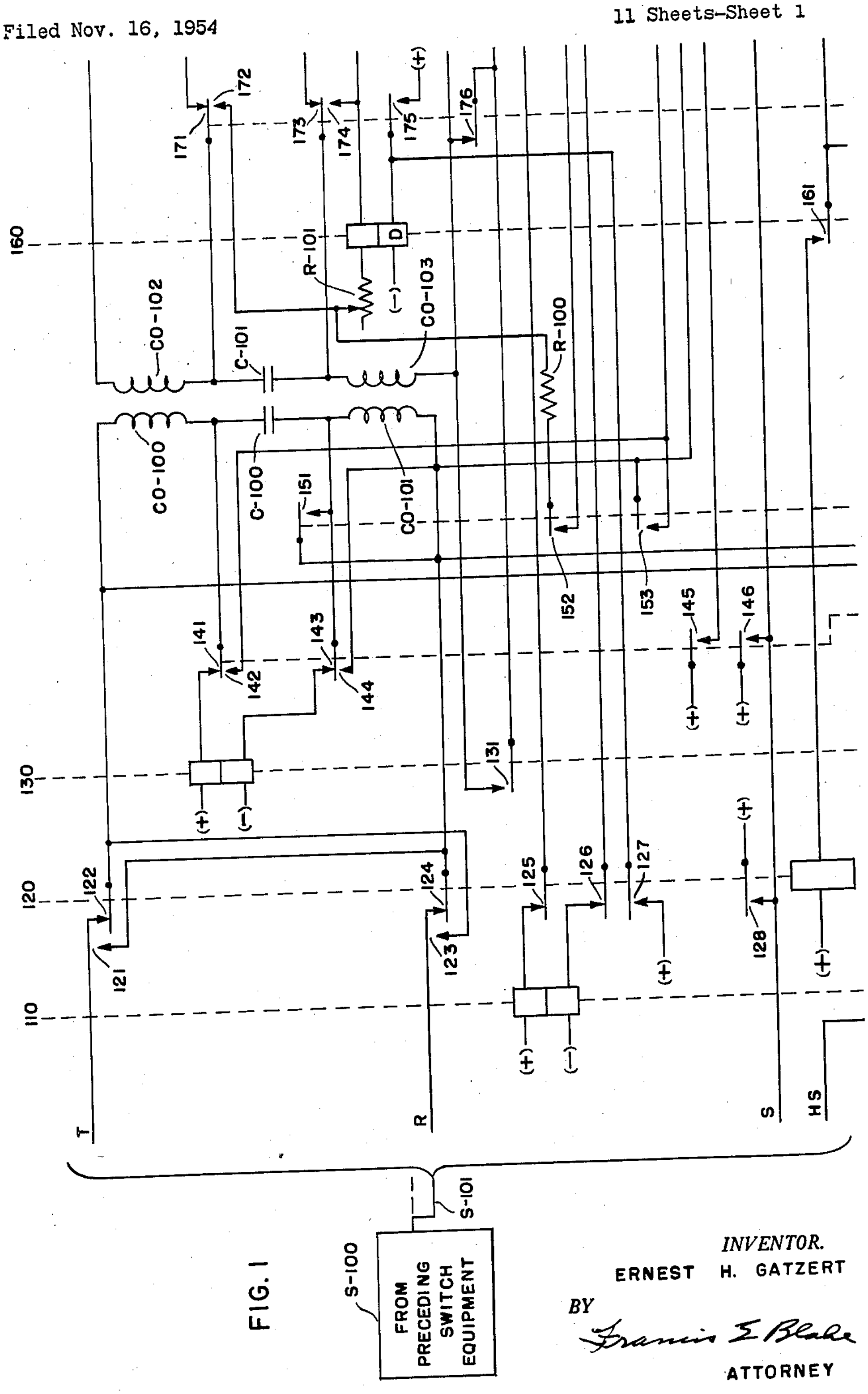
Figure 2:
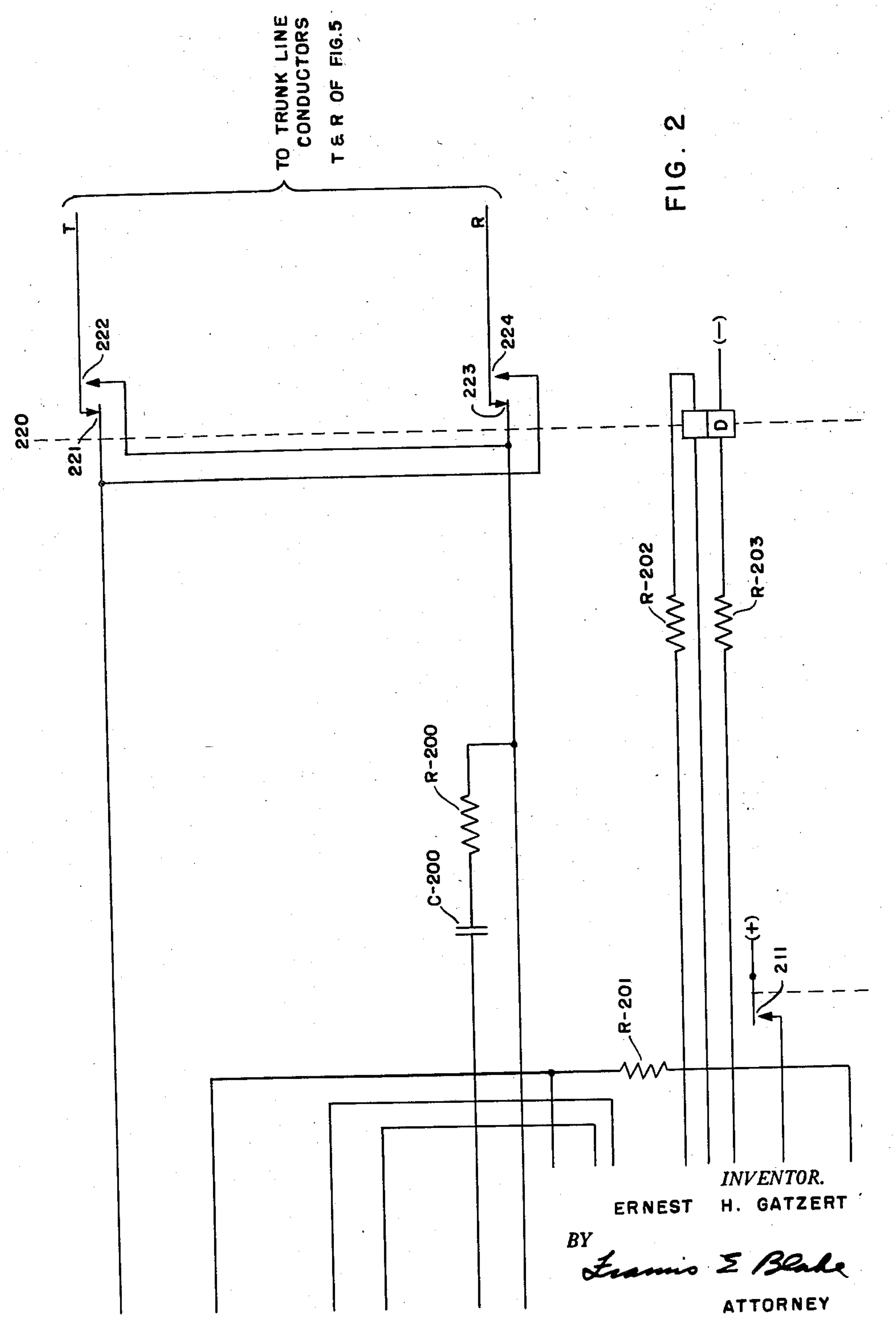
Figure 7:
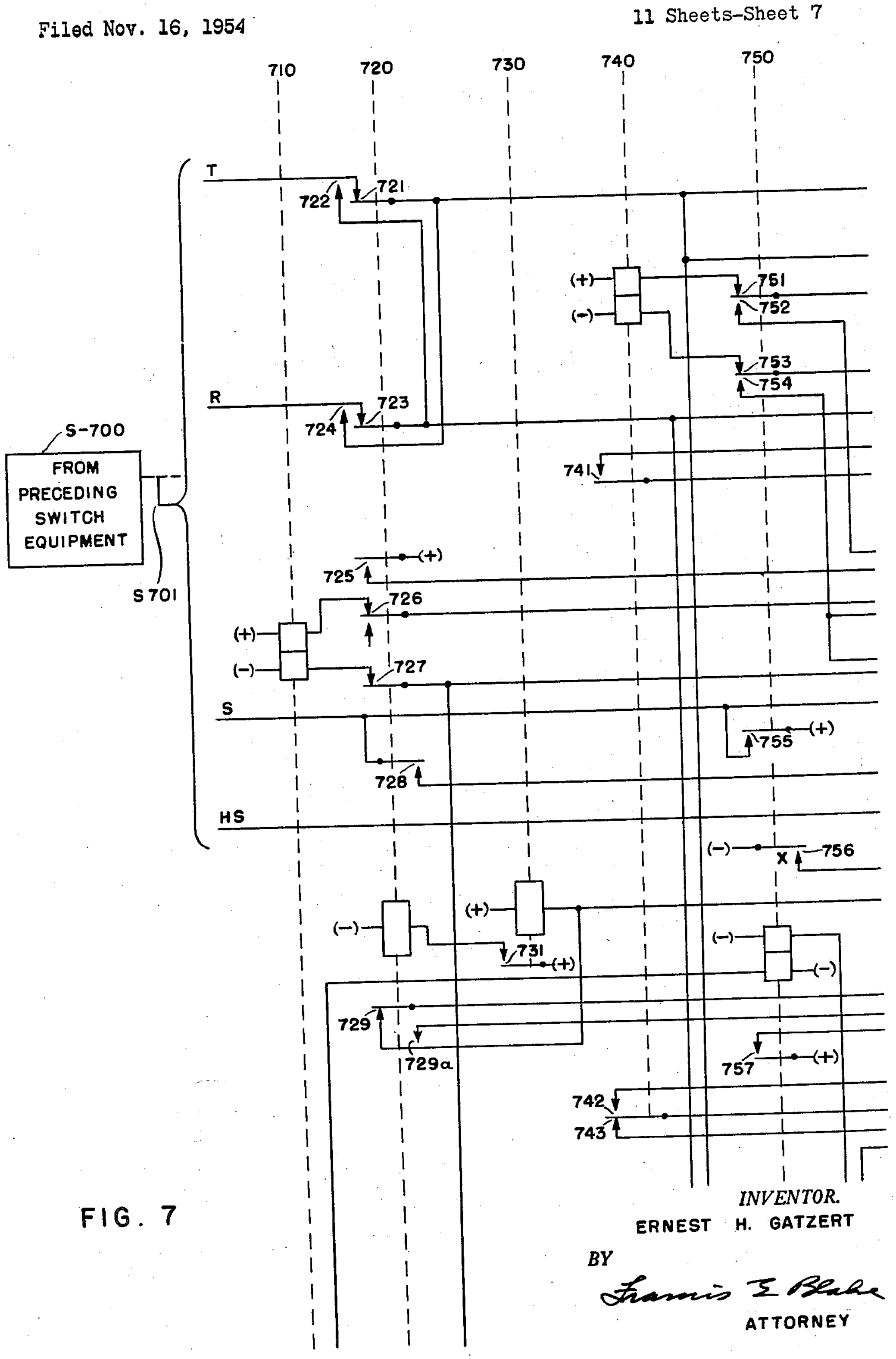
Figure 8:
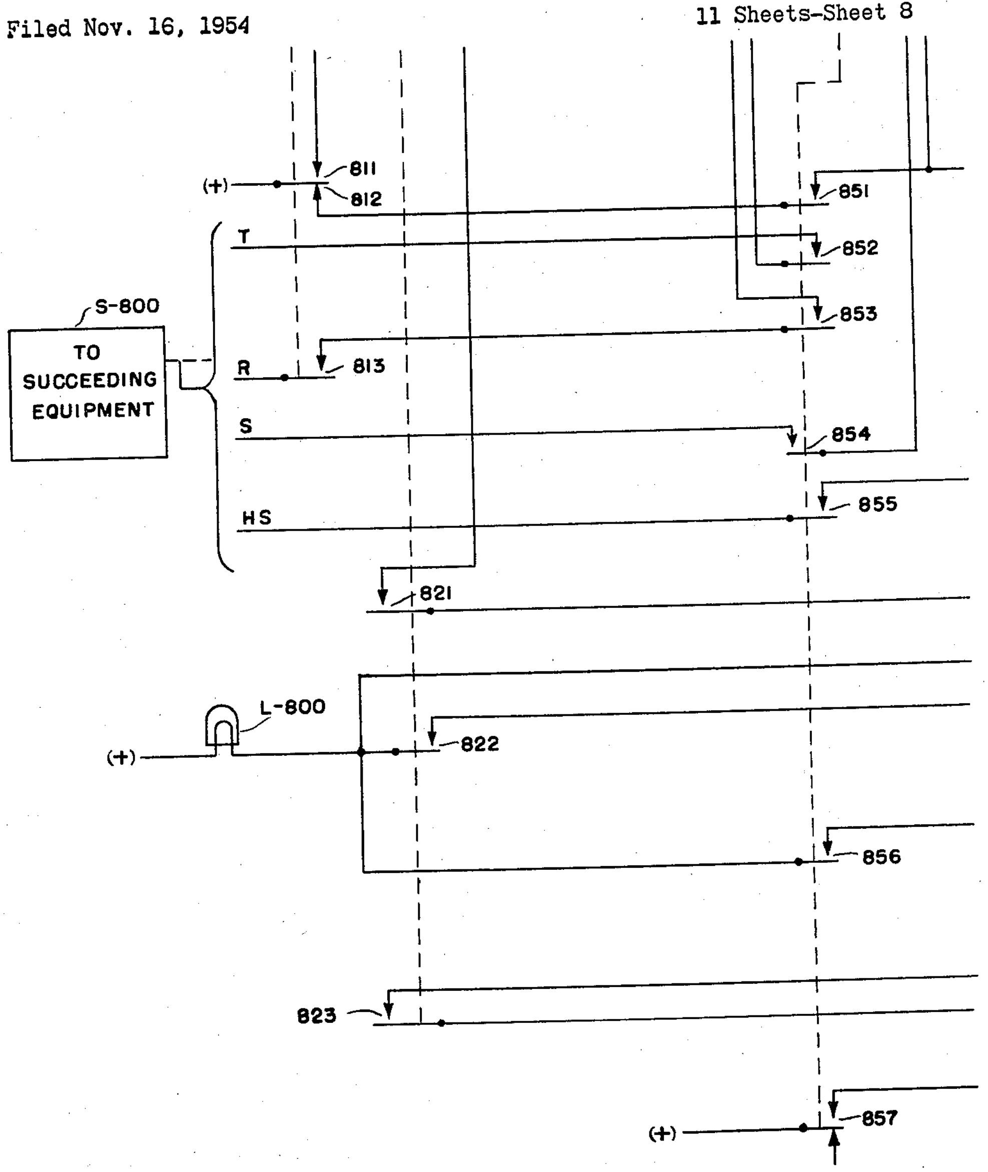
Figure 9:
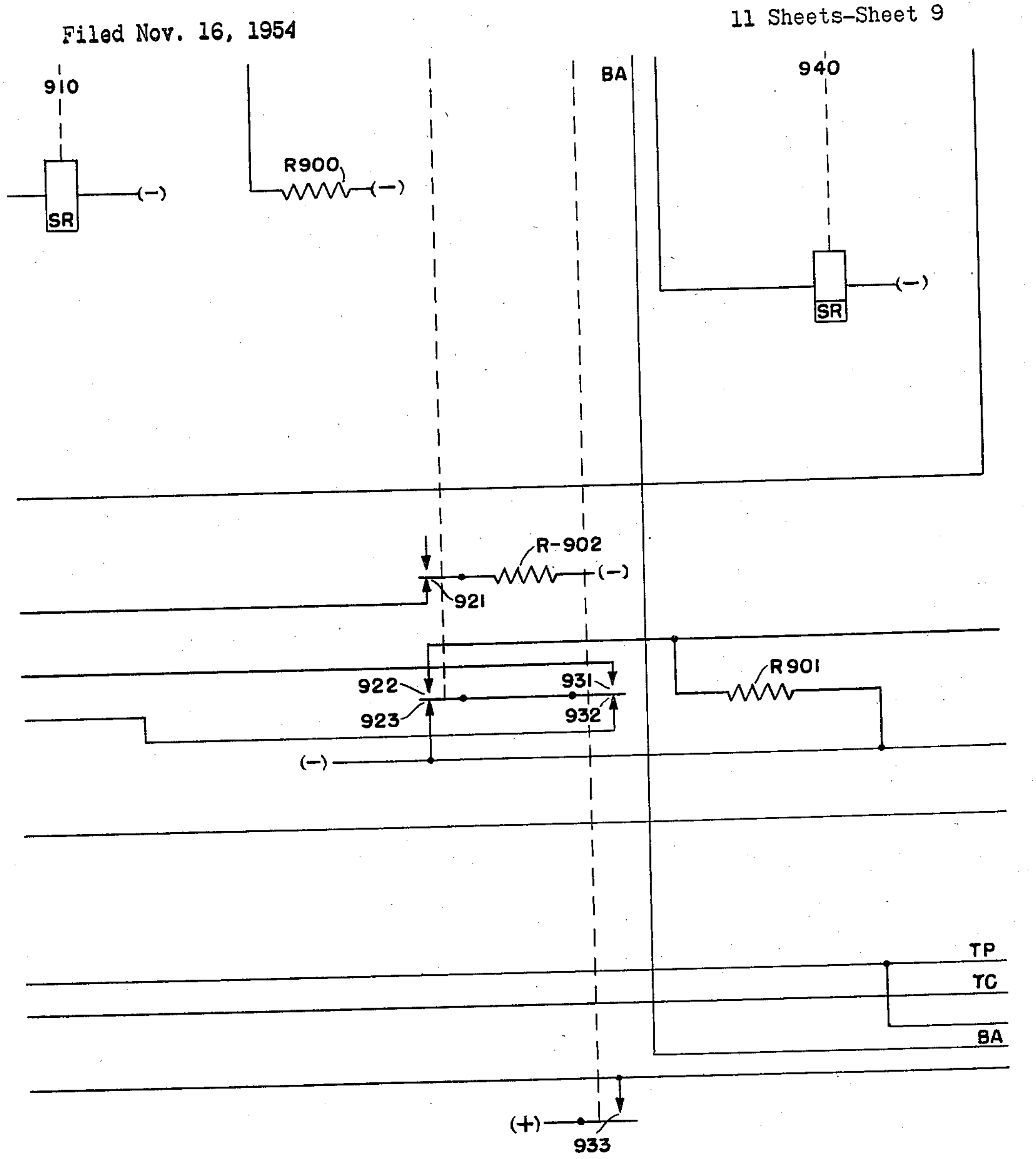
Figure 10:
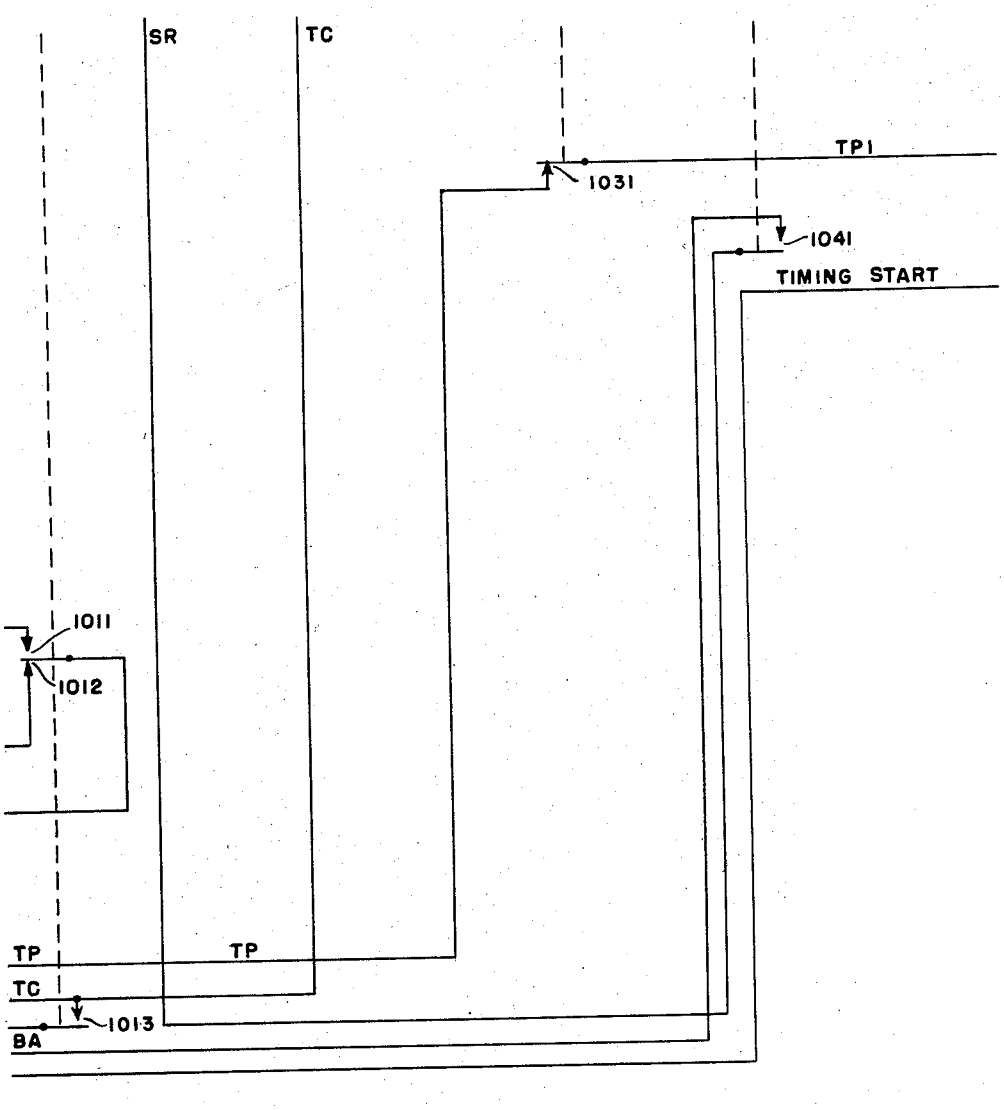

When the called party answers, the incoming selector switch equipment S800 will reverse battery across the talking conductors in the well known manner and thereby cause operation of the supervisory relay 510 due to the aforesaid reversal of current flow in the upper winding of relay 510. The operation of relay 510 reverses the direction of current flow in the trunk line conductors T and R at contacts 511, 512, 513, and 514 so that the differential relay 160 of the remote trunk circuit, shown in Fig. 1 of the drawings, is operated. The operation of relay 160 causes the operation of relay 120 from ground through the coil of relay 120, operated contacts 161, 371, and resistor R400 to battery. The operation of relay 120 reverses the direction of battery flow in conductors T and R at contacts 121, 122, 123, and 124, to the outgoing switch equipment S100 to thereby signal the calling party accordingly. The aforesaid operation of the local trunk circuit relay 510, shown in Fig. 5, dims the monitor lamp L800 to indicate a talking condition of the trunk circuit by connecting battery through resistor R901 and operated contacts 1011 and 856 to lamp L800 and ground. Similarly, the operation of the supervisory relay 160 of the remote trunk circuit, as shown in Fig. 1 of the drawings, is effective to dim lamp L300 by connecting ground through resistor R304, operated contacts 364, 376, and normal contacts 347 to lamp L300 and battery. The operation of relay 120 also closes the connection of ground through contacts 127 to the lower winding of relay 160 and battery so that relay 160 is thereafter held by ground through this alternate connection as well as operated contacts 175. It will be recalled that the operation of relay 750 at the local trunk circuit, as shown in Fig. 7, caused the operation of contacts 857 to connect ground to the timing start lead of a conventional form of common interrupter circuit (not shown). The operation of relay 510, upon answer of the call, is effective to close contacts 1013 and thereby connect the lower winding of a first conversation timing relay 520 through normal contacts 525 and 537, the TC lead, operated contacts 1013 to the TP lead, and through normal contacts 1031 to the TP lead and interrupter contacts, not shown.

The release of the trunk circuit equipment being described, upon ordinary hang up of either the calling or called parties before timing out, will not be referred to in detail since such operation is obvious from the circuit and is conventional.

It will be assumed that the conversation continues until it is timed out by the conversation timing equipment, to be described, including relays 520, 530, 540, 720, and 730. During the time that conversation continues on a call outgoing from switch equipment S100 over the remote trunk circuit, shown in Figs. 1–4 of the drawings, and the trunk line through the local trunk circuit, shown by Figs. 5–10 of the drawings, and the incoming switch equipment S800, the following listed relays are operated, as previously described, namely, relays 120, 130, 160, 370, 410, 710, 750, and 510. After a first time interval, a momentary ground from the common interrupter circuit over the TP1 lead and through normal contacts 1031, operated contacts 1013, normal contacts 537 and 525 to the lower winding of relay 520 and battery, will cause full operation of two step relay 520. The operation of relay 520 is locked up by the circuit from battery through the lower winding of relay 520, operated contacts 526, normal contacts 535, the HG lead and operated contacts 757 to ground. In addition, the operation of relay 520 closes contacts 522 to prepare an operating circuit for relay 530 from battery through normal contacts 532 and operated contacts 522 to the TP2 lead of the common timing interrupter. After another interval of time, as determined by the common interrupter equipment, a momentary ground on the TP2 lead will cause operation of relay 530 through the circuit previously traced. Operation of relay 530 is locked up through operated contacts 533 and 755 to ground and closes contacts 538 to prepare a circuit for connecting warning tone through condenser C500, operated contacts 538, and normal contacts 524, to the tip side of the line when two step relay 520 is again operated to only close its preliminary X contacts 523. The aforesaid operation of relay 530, opened the holding circuit to relay 520 at the then operated contacts 535, to thereby restore relay 520 at that time, and prepare a second operating path for relay 520 through normal contacts 525, operated contacts 536 and resistor R500 to the CWT interrupter lead. The operation of relay 530 also closed contacts 531 to prepare an operating circuit for relay 540 from battery through operated contacts 531 and normal contacts 521 to the H3 interrupter lead. After another interval of time, a momentary ground is applied from the common interrupter to the CWT lead and through resistor R500, operated contacts 536, and normal contacts 525 to the lower winding of relay 520 and battery, to thereby operate two step relay 520 to its preliminary make contacts 523 only. Thus, the momentary closure of preliminary make contacts 523 applies a warning tone through condenser C500, operated contacts 538, normal contacts 524, and operated contacts 523 to the tip side of the trunk line to thereby warn the calling and called parties that the conversation is about to be timed out.

After another short interval of time, a momentary ground from the common interrupter on the H3 lead causes the operation of relay 540 through the previously traced and prepared circuit. As a result of the operation of the conversation timing relay 540, relay 730 will be operated from ground through the coil of relay 730, normal contacts 729, the SR lead, operated contacts 1041, the BA lead, and resistor R605 to battery. The operation of relay 730 causes the operation of relay 720 from ground through operated contacts 731 and the winding of relay 720 to battery. The operation of relay 720 opens contacts 726 and 727 to release the bridge relay 710 and forcibly disconnect the incoming switch equipment S800 by opening contacts 813 to thereby open the loop circuit to the incoming switch equipment S800.

It should also be noted that so long as relay 720 remains operated, relay 710 cannot be operated to seize the local trunk circuit for a subsequent incoming call. Relay 540, which has been operated momentarily by the momentary ground pulse on the conductor H3, is restored, and ground is now applied through normal contacts 541, the SS lead, and operated contacts 728 to the outgoing selector lead S to thereby also guard the local trunk circuit from seizure for subsequent outgoing calls so long as relay 720 remains operated. The forcible dropping of the incoming switch equipment S800 when the circuit to relay 710 was opened, as previously described, results in the removal of guarding ground on the S conductor from the switching equipment S800 so that relay 750 is thereafter restored since both of its operating circuits are now opened at normal contacts 811 and the aforesaid sleeve conductor. The aforesaid operation of relay 720 transfers the operating circuit for relay 730 to ground through the winding of relay 730 and operated contacts 729*a*, normal contacts 622, and resistor R603 to normal contacts 631 and repeat coil winding CO603 through normal contacts 512 to the T side of the trunk line, it being understood that relay 510 has been restored due to the opening of contacts 756 when relay 750 was restored, as previously described. So long as the calling party remains on the line to hold the remote trunk circuit, shown in Figs. 1–4 of the drawings, the aforesaid circuit traced for relay 730 from ground so as to be connected to the tip side of the trunk line, is connected by the loop circuit through the repeat coil winding CO102, operated contacts 172, upper winding of relay 160, operated contacts 174, repeat coil winding CO103, operated contacts 131, the ring side of the trunk line, and then through normal contacts 514, 635, repeat coil CO604, normal contacts 633, operated contacts 821, and normal contacts 921 to resistor R902 and battery. Therefore, relays 730 and 720 will remain operated until the calling party has hung up to restore relays 120, 130, 160, 370 and 410 of the remote trunk circuit in the usual manner, thereby opening the previously traced loop circuit for relay 730. Thereafter, relay 730 restores to restore relay 720 and remove the guarding ground on the incoming sleeve conductor S through the now opened contacts 728.

The circuits of the invention will now be described as they are operated for an outgoing call from the associated local outgoing circuit in the form of selector switch equipment S700 over the local trunk circuit, shown in Figs. 5–10 of the drawings, and the trunk line to the remote trunk circuit, shown by Figs. 1–4 of the drawings, and the associated remote incoming circuit in the form of selector switch S300. On a call from the switch equipment through outgoing selector switch S700 and conductors S701, relay 740 is energized from ground through the upper winding of relay 740, normally closed contacts 751, repeat coil winding CO600, normally closed contacts 721, calling party loop across conductors T and R, normally closed contacts 723, repeat coil winding CO601, normally closed contacts 753, and lower winding of relay 740 to battery. Operation of relay 740 energizes relay 630 from ground through normal contacts 542, the H conductor, operated contacts 742, and the lower winding of relay 630 to battery. The operation of relay 630 energizes relay 940 from the aforesaid ground through normally closed contacts 542, operated contacts 742 and 639*a*, and the winding of relay 940 to battery. Relay 940 has a slow release characteristic which causes it to remain operated while the pulsing relay 740 is responding to subsequent dial pulses.

The operation of relay 630 also lights lamp L800 from battery through normally closed contacts 923, operated contacts 931 and through lamp L800 to ground. Operation of relay 940 closes ground through contacts 643 and the upper winding of relay 630 to battery to thereby hold relay 630 until relay 940 restores upon completion of the call. Ground through operated contacts 643 and 642 is thereby connected to the HG conductor for subsequent operation of the conversation timing relay 520 to be later described. Operation of relay 940 also connects ground through operated contacts 644, to the sleeve conductor S to thereby hold the preceding switching equipment S700 which is extending the call. The aforesaid operation of relay 630 also connected ground through preliminary make X contacts 636 to the lower winding of relay 620 and battery, thus preparing a circuit for the subsequent operation of the differential relay 620.

The operation of relay 630 also opens contacts 635 so that the trunk line conductors are now connected in a loop circuit from conductor T, normally closed contacts 512, repeat coil winding CO603, operated contacts 632, resistor R602, upper winding of differential relay 620, operated contacts 634, repeat coil winding CO604, operated contacts 741 and normally closed contacts 514 to the trunk line conductor R. Operation of relay 630 also opens the circuit to resistor R604 and normally closed contacts 637 from the succeeding equipment and connects it through operated contacts 638 and normally closed contacts 624 to the conductor HS for normal supervision indication. Operation of relay 630 also connects battery through resistor R605, operated contacts 639, resistor R603, normally closed contacts 726, and upper winding of relay 710 to ground. In addition, the operation of relay 630 also connects ground through contacts 933 to the timing start lead of the common interrupter circuit to enable the subsequent operation of he conversation timing circuit to be described.

Figure 3:
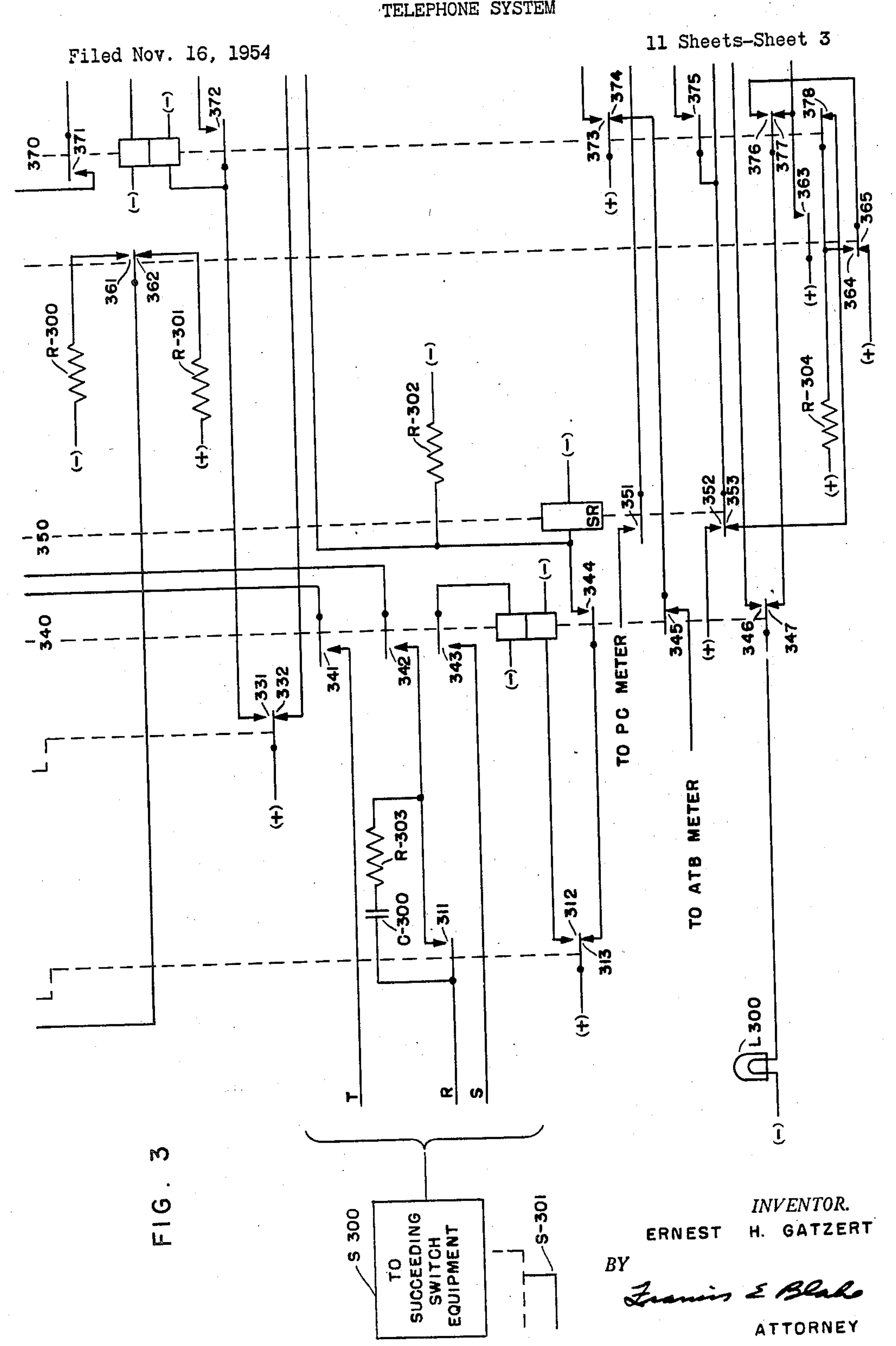
Figure 4:
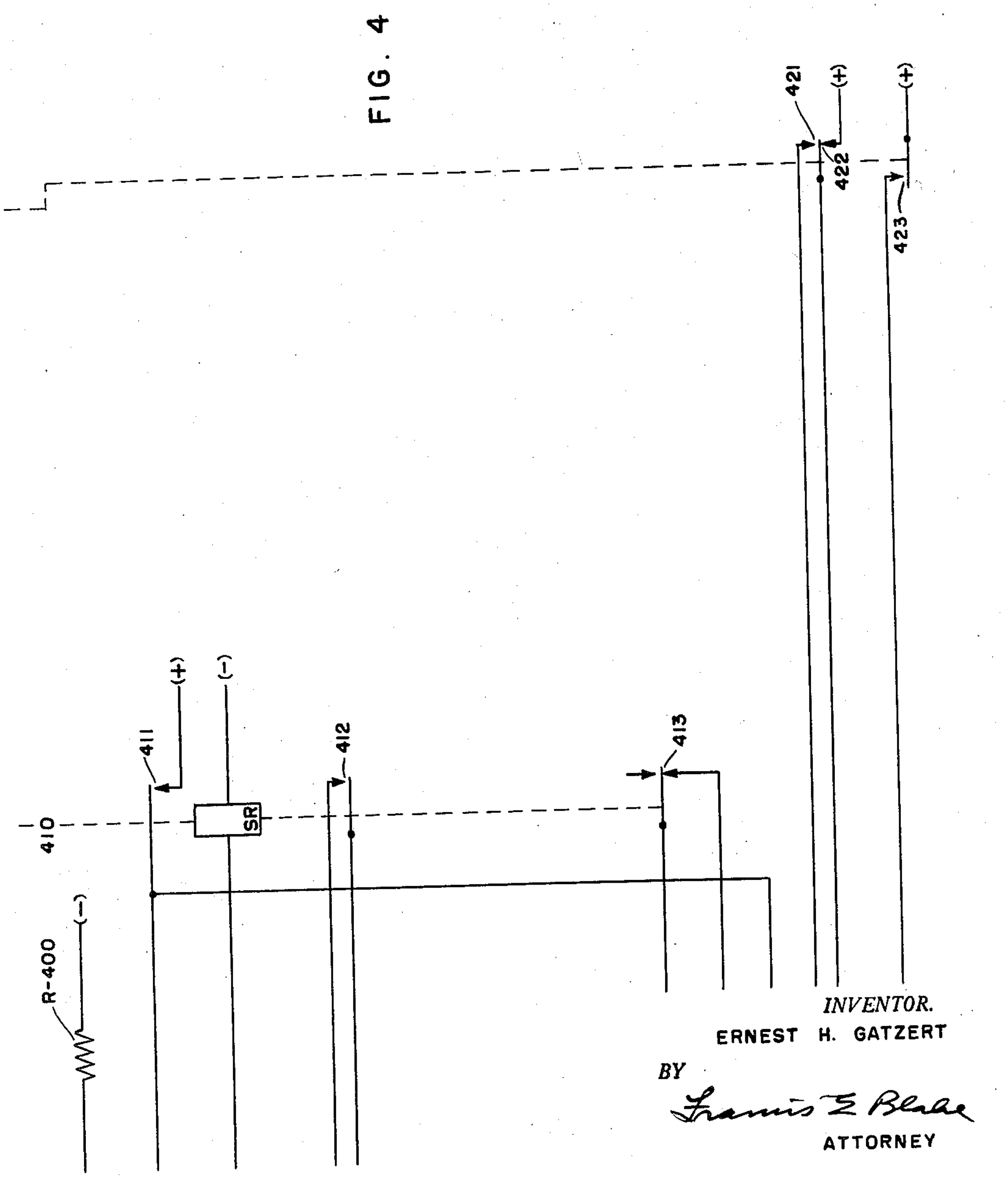
Figure 5:
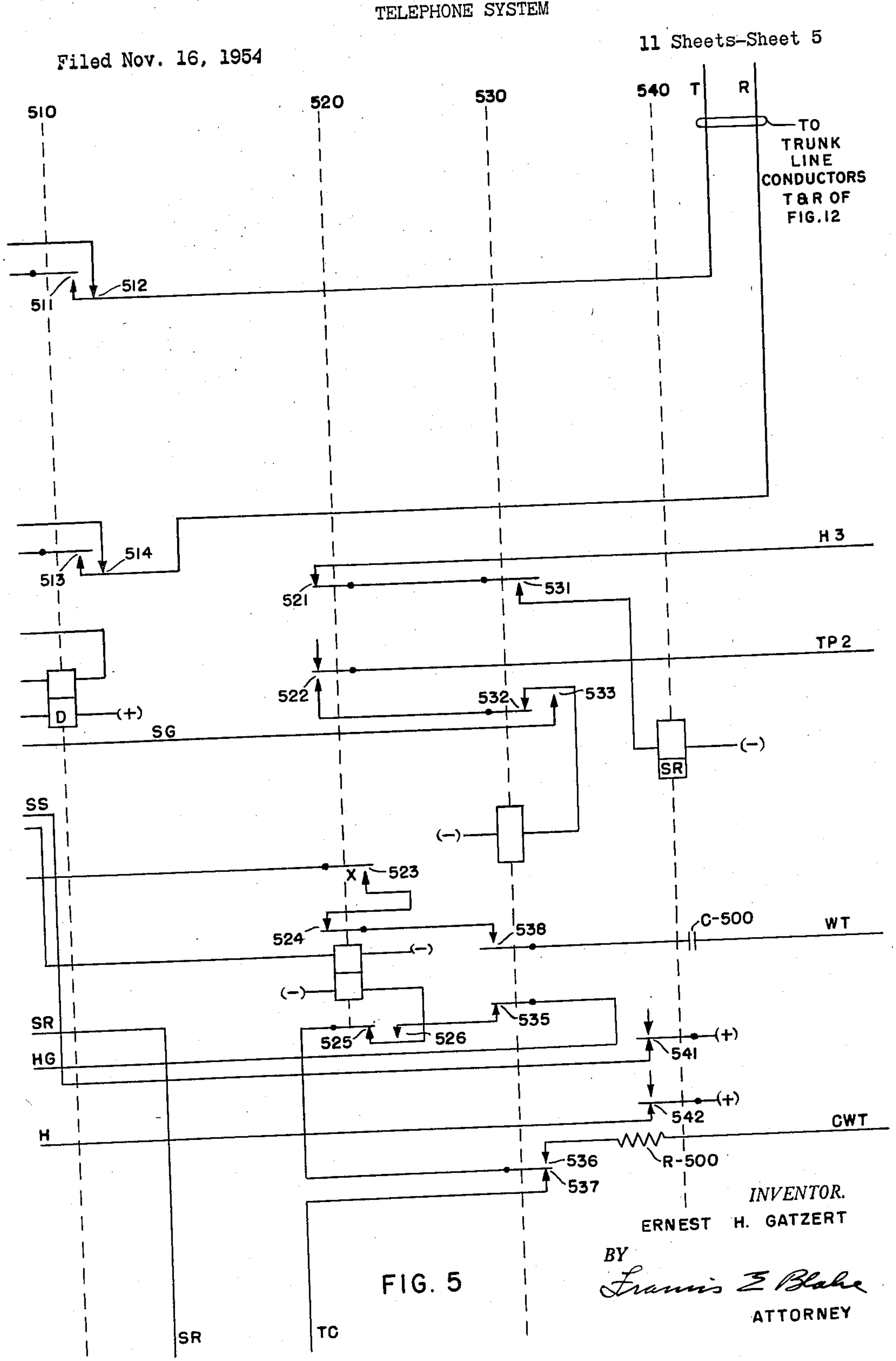

The loop circuit previously described as being across trunk line conductors T and R, energizes the incoming calling bridge relay 110 at the remote called office by a circuit from ground through the upper winding of relay 110, normally closed contacts 125 and 171, repeat coil winding CO102, normally closed contacts 221, the aforesaid loop circuit across trunk line conductors T and R, normally closed contacts 223 and 176, repeat coil winding CO103, normally closed contacts 173 and 126, and lower winding of relay 110 to battery. The operation of relay 110 energizes relay 340 from ground through operated contacts 312 and the lower winding of relay 340 to battery. The operation of relay 340 closes a loop circuit across the succeeding associated incoming remote circuit switching equipment S300 and S301 from conductor T through operated contacts 341, repeat coil winding CO100, operated contacts 142, resistor R202, the upper winding of supervisory relay 220, operated contacts 144, repeat coil winding CO101, operated contacts 342 and 311 to the incoming ring conductor R (Fig. 3). The pulsing contacts 311 have a capacitor C300 and series connected resistor R303 connected across them. The operation of relay 340 also connects ground through operated contacts 145 and resistor R203 to the lower winding of differential relay 220 and battery to thereby prevent operation of the supervisory relay 220 until the direction of current flow in the upper winding of relay 220 is reversed upon answer supervision from the incoming switch equipment S300, in the conventional manner.

The operation of relay 340 also connects ground through operated contacts 146 to the sleeve conductor S of the trunk circuit from the outgoing switch S100 to thereby guard the trunk circuit against calls from that source at this time. Operation of relay 340 also locks relay 340 to ground from the incoming equipment S300 and S301 on the S conductor through operated contacts 343 and the upper winding of relay 340 to battery. Operation of relay 340 also lights lamp L300 from ground through normally closed contacts 422, operated contacts 346 and monitor lamp L300 to battery.

The calling party using the local outgoing switch equipment S700 and conductors S701 may now cause pulsing relay 740 to respond to dial pulses in the well known manner. Relay 740 will correspondingly open operated pulsing contacts 741 to enable operation of the incoming switching equipment S300 at the remote office by the operation of pulsing relay 110 to thereby connect with the desired called station by means of conductor S301. Slow release relay 910 is held operated by the momentary ground during pulsing through normal contacts 542, H conductor, momentarily restored pulsing contacts 743, operated contacts 641 and winding of relay 910 in parallel with the resistor R900 to battery. The operation of relay 910 shunts the repeat coil winding CO600 by operated contacts 611, and also shunts the upper winding of relay 510 and resistor R606 by means of operated contacts 613 in series with resistor R600 to improve pulsing conditions. At the end of the dial impulsing, the slow release relay 910 is restored, as is conventional.

When the called station answers, the differential supervisory relay 220 is operated by reversal of battery over the T and R conductors from the incoming switch equipment S300 in response to the usual operation of the answer bridge relay of the incoming switch equipment S300. The operation of relay 220 reverses the direction of current flow on the trunk line conductors by opening contacts 221 and 223 and closing contacts 222 and 224 to thereby operate the differential relay 620 of the local trunk circuit extending the call. The operation of relay 220 also opens ground from lamp L300 at contacts 422 and connects lamp L300 through operated contacts 345, 421, normally closed contacts 353 and 378 to ground through resistor R304 to dim lamp L300 to indicate a conversation condition for the remote trunk circuit.

The aforesaid operation of the supervisory differential relay 620 opens battery from lamp L800 at contacts 923, and closes battery through resistor R901 and operated contacts 922 and 931 to dim lamp L800 during conversation. If the call from the outgoing switch equipment S700 does not require conversation timing, the incoming switch conductor HS (Fig. 7) will have marking ground thereon as supplied from the switch equipment S700 and relay 520 will operate from such optional marking ground through operated contacts 623, the HS conductor, and the upper winding of relay 520 to battery. This operation of relay 520 will prevent interference with the call by conversation timing release as provided by the subsequent operations of relays 530 and 540, to be described in the following paragraphs.

The aforesaid operation of relay 620 upon answer of the call, causes operation of relay 730 from battery through resistor R605, preliminary make X contacts 639, operated contacts 621, and winding of relay 730 to ground. The operation of relay 730 energizes relay 720 from ground through operated contacts 731 and winding of relay 720 to battery. The operation of relay 720 reverses the direction of current flow on the talking conductors to the outgoing switch equipment S701 and S700 to thereby indicate an answer condition to the calling office by transferring contacts 721 and 722 in line conductor T and contacts 723 and 724 in line conductor R. A multiple ground through operated contacts 725 is also connected to the lower winding of differential relay 620.

If conversation timing is not to be provided as indicated by the previously described condition of marking ground on the HS conductor from the switch equipment S700 and S701, relay 740 releases upon hang up by the calling party to open holding ground for relays 630 and 940. Restoration of these relays and relay 740 opens the loop circuit on trunk line conductors T and R to thereby release relays 110 and 340 in the distant office, which restores the distant office switch equipment to its normal condition ready for subsequent calls.

The forced release of the circuits of the invention when using conversation timing will now be described, and it will be recalled that there will be no marking ground on the HS conductor from the switch equipment S700 and S701 when the conversation timing is to be provided. Therefore, during conversation and before timing out, the following relays will be operated, namely, relays 740, 630, 640, 940, 110, 340, 220, 620, 730, and 720. Relay 520 is now connected in a circuit from battery through the lower winding of relay 520, normal contacts 525, 537, the TC conductor, operated contacts 823, the TP conductor, and normal contacts 1031 to the TP1 interrupter lead. A momentary ground from the TP1 interrupter lead will therefore cause relay 520 to operate as the conversation proceeds and relay 520 is thereafter locked up by a circuit from battery through its lower winding, operated contacts 526, normal contacts 535, the HG conductor, and operated contacts 642 and 643 to ground. The operation of relay 520 closes contacts 522 to connect relay 530 in a circuit from battery through the winding of relay 530, normal contacts 532 and operated contacts 522 to the common interrupter TP2 lead. At a later interval during the conversation, a momentary ground on the TP2 interrupter conductor lead will cause the operation of relay 530 through the circuit, as described, which by operated contacts 535 opens the circuit to relay 520 thereby restoring relay 520. The operation of relay 530 closes contacts 533 to maintain relay 530 operated from ground through operated contacts 644 and the SG conductor, operated contacts 533 and winding of relay 530 to battery. The operation of relay 530 also connects relay 540 in a circuit from battery through operated contacts 531 and now restored contacts 521 through the common interrupter H3 conductor. The operation of relay 530 also closes contacts 538 to prepare a circuit for connecting warning tone from the condenser C500 to one side of the trunk line, and additionally closes a circuit from the common interrupter CWT lead through resistor R500 and operated contacts 536, normal contacts 525, and lower winding of relay 520 to battery. Thereafter, a momentary ground on the common interrupter CWT lead, as conducted through resistor R500, will reoperate relay 520 to its preliminary make contacts 523 only, which therefore momentarily applies warning tone through condenser C500, operated contacts 538, normal contacts 524, and preliminary operated contacts 523 to one side of the trunk line. After a short interval following the application of warning tone to the line, a momentary ground on the common interrupter H3 conductor will cause operation of relay 540 through the circuit including normal contacts 521 and operated contacts 531, as previously described. The operation of the conversation timing relay 540 opens contacts 542 to remove the holding ground from relay 940 which thereby restores to open the operating ground for relay 630 at now opened contacts 643 and 642, thereby restoring relay 630. The restoration of relay 630 opens contacts 632 and 634 and closes contacts 631 and 633 to thereby restore relay 620. With relay 620 restored, relay 730 is now connected to the trunk line from ground through the winding of relay 730, operated contacts 729*a*, normal contacts 622, resistor R603, normal contacts 631, repeat coil CO603, normal contacts 512 and the T conductor of the trunk line through operated contacts 222, normal contacts 176, repeat coil CO103, normal contacts 173, 126, and the lower winding of relay 110 to battery. The upper winding of relay 110 is connected from ground through normal contacts 125, 171, repeat coil winding CO102, operated contacts 224, the ring conductor of the trunk line, normal contacts 514, 635, the repeat coil winding CO604, normal contacts 633, and operated contacts 821 to normal contacts 921 and resistor R902 to battery. The value of the resistors R902 and R603 is such that the loop circuit for the bridge relay 110, as previously described, will not pass sufficient current to maintain relay 110 operated. Therefore, relay 110 will be dropped to forcibly disconnect the incoming remote circuit switch equipment S300 by opening the loop to the succeeding incoming switch equipment at normal contacts 311. However, the relay 730 will remain operated until the distant equipment at the remote office, including the remote trunk circuit of Figs. 1–4, has been released from connection with either of its associated incoming or outgoing remote circuits following the restoration of relay 110 and subsequent restoration of relay 340, which had been locked to the sleeve conductor from the remote incoming switch equipment S300.

The release of relay 340 will cause a subsequent release of relay 220 which thereby reverses battery across the tip and ring conductors of the trunk line through a transfer of contacts 221, 222, and 223, 224, as is well known. The reversal of battery connections by the release of relay 220 now causes the release of relay 730 since relay 730 is now connected from ground through the winding of relay 730, operated contacts 729*a*, normal contacts 622, resistor R603, normal contacts 631, repeat coil CO603, normal contacts 512 to the T side of the trunk line and through normal contacts 221, the repeat coil CO102, normal contacts 171 and 125, to the upper winding of relay 110 and ground. Thus in such manner, since ground is presented to both sides of the winding of relay 730, relay 730 restores, thereby restoring relay 720.

During the forcible release of the incoming remote switch equipment S300 associated with the remote trunk circuit, shown in Figs. 1–4 of the drawings, in response to the operation of the conversation timing relay 540 in the local trunk circuit, shown by Figs. 5–10 of the drawings, relays 720 and 730 remain operated over the previously traced circuits. The local outgoing switch equipment S700 that was extending the call that has now been timed out, had been released by a procedure known as wink-off in that the first restoration of relay 940 removed ground on the sleeve conductor at the then opened contacts 644. This caused the outgoing switch equipment S700 to be released although a lock out line circuit, as is conventionally provided, will prevent the calling party from again reseizing the trunk circuit of Figs. 5–10. Therefore, relay 740 is restored subsequent to the forced release of the switch equipment S700 by the operation of the conversation timing relay 540 that is effective to restore relay 940, as previously described. Conversation timing relay 540, however, does not remain operated after the disappearance of the momentary ground from the common interrupter conductor H3 and upon restoration of relay 540, ground is then connected through normal contacts 541, the SS conductor, and operated contacts 728 to the sleeve conductor of the trunk circuit to the outgoing switch equipment S700, thereby guarding the trunk circuit of Figs. 5–10 of the drawings against reseizure so long as relays 720 and 730 remain operated and until the complete release of the remote trunk circuit equipment of Figs. 1–4 of the drawings, as previously described.

Having described the trunk circuits of the invention and, in particular, the conversation timing arrangement, it should be understood that the relays 720 and 730 are effective to guard the trunk circuit of Figs. 5–10 of the drawings against seizure after the conversation has been timed out and until the equipment at the distant trunk office has been released regardless of whether the call is incoming to, or outgoing from, the trunk circuit of Figs. 5–10 of the drawings. In the event that the conversation connection is incoming to the trunk circuit of Figs. 5–10 of the drawings, and such connection is timed out by the conversation timing arrangement of the invention, relay 730 is connected in a loop circuit over the trunk line conductor to the remote trunk circuit in series with battery from resistor R902 and ground, both originating in the trunk circuit of Figs. 5–10 of the drawings. In the event that the call has been outgoing from the trunk circuit of Figs. 5–10 of the drawings, and has been timed out by the conversation timing arrangements of the invention, guarding relays 730 and 720 are maintained operated by a circuit from ground through guarding relay 730 to battery of the bridging relay at the trunk circuit in the remote office. When the trunk circuit for the remote office is released, the battery feed connections are reversed and the guarding relay 730 is therefore shunted and restored. It will be noted that in either case the guarding relays 720 and 730 are effective to guard the local two way trunk circuit of Figs. 5–10 of the drawings against seizure after timing out until the remote trunk circuits have been released.

Various modifications may be made within the spirit of the invention and the scope of the appended claims.

What is claimed is:

1. A telephone system comprising, a local two way trunk circuit, local incoming and outgoing circuits associated with said local trunk circuit, a remote two way trunk circuit, remote incoming and outgoing circuits associated with said remote trunk circuit, a trunk line interconnecting said trunk circuits, means for connecting an associated outgoing circuit with one of said trunk circuits and an associated incoming circuit with the other of said trunk circuits depending upon the direction of the call, one of said trunk circuits having first means operative to break the connection between either one of said trunk circuits and its associated incoming circuit, and said one trunk circuit having second means operative in response to the operation of said first means to prevent a subsequent connection of the one trunk circuit with an associated circuit until after the other trunk circuit has been disconnected from its associated circuits.

2. A telephone system comprising, a local two way trunk circuit, local incoming and outgoing circuits associated with said local trunk circuit, a remote two way trunk circuit, remote incoming and outgoing circuits associated with said remote trunk circuit, a trunk line interconnecting said trunk circuits, means for connecting an associated outgoing circuit with one of said trunk circuits and an associated incoming circuit with the other of said trunk circuits depending upon the direction of the call, one of said trunk circuits having conversation timing means operative to break the connection between either one of said trunk circuits and its associated incoming circuit, and said one trunk circuit having means operative in response to the operation of said conversation timing means to prevent a subsequent connection of the one trunk circuit with an associated circuit until after the other trunk circuit has been disconnected from its associated circuits.

3. A telephone system comprising, a local two way trunk circuit, local incoming and outgoing circuits associated with said local trunk circuit, a remote two way trunk circuit, remote incoming and outgoing circuits associated with said remote trunk circuit, a trunk line interconnecing satid trunk circuits, means for connecting an associated outgoing circuit with one of said trunk circuits and an associated incoming circuit with the other of said trunk circuits depending upon the direction of the call, said local trunk circuit having first means operative to break the connection between either one of said trunk circuits and its associated incoming circuit, and said local trunk circuit having second means operative in response to the operation of said first means to prevent a subsequent connection of the local trunk circuit with an associated circuit until after the remote trunk circuit has been disconnected from its associated circuits.

4. A telephone system comprising, a local two way trunk circuit, local incoming and outgoing circuits associated with said local trunk circuit, a remote two way trunk circuit, remote incoming and outgoing circuits associated with said remote trunk circuit, a trunk line interconnecting said trunk circuits, means for connecting an associated outgoing circuit with one of said trunk circuits and an associated incoming circuit with the other of said trunk circuits depending upon the direction of the call, said local trunk circuit having conversation timing means operative to break the connection between either one of said trunk circuits and its associated incoming circuit, and said local trunk circuit having means operative in response to the operation of said conversation timing means to prevent a subsequent connection of the local trunk circuit with an associated circuit until after the remote trunk circuit has been disconnected from its associated circuits.

5. A telephone system comprising, a local two way trunk circuit, local incoming and outgoing circuits associated with said local trunk circuit, a remote trunk circuit, a remote outgoing circuit associated with said remote trunk circuit, a trunk line interconnecting said trunk circuits, means for connecting the associated outgoing circuit with said remote trunk circuit and an associated incoming circuit with the local trunk circuit, said local trunk circuit having first means operative to break the connection to its associated incoming circuit, and said local trunk circuit having second means operative in response to the operation of said first means to prevent a subsequent connection of the local trunk circuit with an associated circuit until after the remote trunk circuit has been disconnected from its outgoing circuit.

6. A telephone system comprising, a local two way trunk circuit, local incoming and outgoing circuits associated with said local trunk circuit, a remote trunk circuit, a remote outgoing circuit associated with said remote trunk circuit, a trunk line interconnecting said trunk circuits, means for connecting the associated outgoing circuit with said remote trunk circuit and an associated incoming circuit with the local trunk circuit, said local trunk circuit having conversation timing means operative to break the connection to its associated incoming circuit, and said local trunk circuit having means operative in response to the operation of said conversation timing means to prevent a subsequent connection of the local trunk circuit with an associated circuit until after the remote trunk circuit has been disconnected from its outgoing circuit.

7. A telephone system comprising, a local trunk circuit, a local outgoing circuit associated with said local trunk circuit, a remote trunk circuit, a remote incoming circuit associated with said remote trunk circuit, a trunk line interconnecting said trunk circuits, means for connecting the associated outgoing circuit with said local trunk circuit and the associated incoming circuit with the remote trunk circuit, said local trunk circuit having first means operative to break the connection between the remote trunk circuit and its associated incoming circuit, and said local trunk circuit having second means operative in response to the operation of said first means to prevent a subsequent connection of the local trunk circuit with its outgoing circuit until after the remote trunk circuit has been disconnected from its incoming circuit.

8. A telephone system comprising, a local trunk circuit, a local outgoing circuit associated with said local trunk circuit, a remote trunk circuit, a remote incoming circuit associated with said remote trunk circuit, a trunk line interconnecting said trunk circuits, means for connecting the associated outgoing circuit with said local trunk circuit and the associated incoming circuit with the remote trunk circuit, said local trunk circuit having conversation timing means operative to break the connection between the remote trunk circuit and its associated incoming circuit, and said local trunk circuit having means operative in response to the operation of said conversation timing means to prevent a subsequent connection of the local trunk circuit with its outgoing circuit until after the remote trunk circuit has been disconnected from its incoming circuit.

9. A telephone system comprising, a local trunk circuit, a local incoming circuit associated with said local trunk circuit, a remote trunk circuit, a remote outgoing circuit associated with said remote trunk circuit, a trunk line interconnecting said trunk circuits, means for connecting the associated outgoing circuit with the remote trunk circuit and the associated incoming circuit with the local trunk circuit, said local trunk circuit having first means operative to break the connection to its associated incoming circuit, and said local trunk circuit having second means operative in response to the operation of said first means to prevent a subsequent connection of the local trunk circuit with its associated incoming circuit until after the remote trunk circuit has been disconnected from its outgoing circuit.

10. A telephone system comprising, a local trunk circuit, a local incoming circuit associated with said local trunk circuit, a remote trunk circuit, a remote outgoing circuit associated with said remote trunk circuit, a trunk line interconnecting said trunk circuits, means for connecting the associated incoming circuit with said local trunk circuit and the associated outgoing circuit with the remote trunk circuit, said local trunk circuit having conversation timing means operative to break the connection between the local trunk circuit and its associated incoming circuit, and said local trunk circuit having second means operative in response to the operation of said conversation timing means to prevent a subsequent connection of the local trunk circuit with its incoming circuit until after the remote trunk circuit has been disconnected from its outgoing circuit.

11. A telephone system comprising, a local trunk circuit, a local outgoing circuit associated with said local trunk circuit, a remote trunk circuit, a remote incoming circuit associated with said remote trunk circuit, a trunk line interconnecting said trunk circuits, means for connecting the associated outgoing circuit with said local trunk circuit and the associated incoming circuit with the remote trunk circuit, one of said trunk circuits having first means operative to break the connection between the remote trunk circuit and its associated incoming circuit, and said one trunk circuit having second means operative in response to the operation of said first means to prevent a subsequent connection of the one trunk circuit with its associated circuit until after the other trunk circuit has been disconnected from its associated circuit.

12. A telephone system comprising, a local trunk circuit, a local incoming circuit associated with said local trunk circuit, a remote trunk circuit, a remote outgoing circuit associated with said remote trunk circuit, a trunk line interconnecting said trunk circuits, means for connecting the associated incoming circuit with said local trunk circuit and the associated outgoing circuit with the remote trunk circuit, one of said trunk circuits having first means operative to break the connection between the local trunk circuit and its associated incoming circuit, and said one trunk circuit having second means operative in response to the operation of said first means to prevent a subsequent connection of the one trunk circuit with its associated circuit until after the other trunk circuit has been disconnected from its associated circuit.

References Cited in the file of this patent

UNITED STATES PATENTS

| | | |
|---|---|---|
| 2,595,388 | Kessler | May 6, 1952 |
| 2,647,163 | Lomax | July 28, 1953 |
| 2,702,314 | Pharis | Feb. 15, 1955 |